(12) United States Patent
Besson et al.

(10) Patent No.: US 12,136,269 B1
(45) Date of Patent: Nov. 5, 2024

(54) METRIC VISUALIZATION SYSTEM FOR MODEL EVALUATION

(71) Applicant: Zoox, Inc., Foster City, CA (US)

(72) Inventors: Clement Besson, San Francisco, CA (US); Scott M. Purdy, Lake Forest Park, WA (US); Bharadwaj Raghavan, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 557 days.

(21) Appl. No.: 17/514,632

(22) Filed: Oct. 29, 2021

(51) Int. Cl.
*G06V 20/56* (2022.01)
*B60W 60/00* (2020.01)
*G06N 3/08* (2023.01)
*G06T 7/73* (2017.01)
*G06V 10/25* (2022.01)

(52) U.S. Cl.
CPC .............. *G06V 20/56* (2022.01); *B60W 60/00* (2020.02); *G06N 3/08* (2013.01); *G06T 7/73* (2017.01); *G06V 10/25* (2022.01); *B60W 2556/45* (2020.02); *G06T 2207/20081* (2013.01); *G06T 2207/20084* (2013.01); *G06T 2210/12* (2013.01)

(58) Field of Classification Search
CPC ....... G06V 20/56; G06V 10/25; B60W 60/00; B60W 2556/45; G06N 3/08; G06T 7/73; G06T 2207/20081; G06T 2207/20084; G06T 2210/12
See application file for complete search history.

(56) References Cited

U.S. PATENT DOCUMENTS

2021/0216823 A1\* 7/2021 Oosake ..................... G06T 7/11

\* cited by examiner

*Primary Examiner* — Christopher M Brandt
(74) *Attorney, Agent, or Firm* — Lee & Hayes, P.C.

(57) ABSTRACT

Techniques for evaluating and validating progress of training machine-learned models are described herein. The techniques may include storing, in a database, metric data associated with outputs from machine-learned models based on sensor data inputs. For instance, the metric data may include first metric data associated with a first bounding box output by a machine-learned model and second metric data associated with a second bounding box output by an updated version of the machine-learned model. The techniques also include a graphical user interface (GUI) for presenting visualizations of the metric data that improve the ability to evaluate the performance of a machine-learned model. In some examples, an indication of a request to evaluate the updated version of the machine-learned model may be received via the GUI. Based on the indication, the GUI may cause presentation of visualization(s) of difference(s) between first metric(s) of the first metric data and second metric(s) of the second metric data.

20 Claims, 9 Drawing Sheets

EVALUATION TABLE 126

| | EVALUATION ID 200(1) | | | |
|---|---|---|---|---|
| GIT_SHA ID 202(1) | VALIDATION DATASET ID 204(1) | MODEL PATH ID 206(1) | EVALUATION PARAMETERS PATH ID 208(1) |
| | EVALUATION ID 200(2) | | | |
| GIT_SHA ID 202(2) | VALIDATION DATASET ID 204(2) | MODEL PATH ID 206(2) | EVALUATION PARAMETERS PATH ID 208(2) |
| | EVALUATION ID 200(3) | | | |
| GIT_SHA ID 202(3) | VALIDATION DATASET ID 204(3) | MODEL PATH ID 206(3) | EVALUATION PARAMETERS PATH ID 208(3) |
| | EVALUATION ID 200(N) | | | |
| GIT_SHA ID 202(N) | VALIDATION DATASET ID 204(N) | MODEL PATH ID 206(N) | EVALUATION PARAMETERS PATH ID 208(N) |

BOX METRIC TABLE 128

| | BOX ID 210(1) | | | | | | |
|---|---|---|---|---|---|---|---|
| EVALUATION ID 200(1) | LABEL JOB ID 214(1) | IMAGE ID 216(1) | GROUND TRUTH ID 218(1) | VISION TRACK ID 220(1) | METRIC(S) 222(1) | METADATA 224(1) |
| | BOX ID 210(2) | | | | | | |
| EVALUATION ID 200(2) | LABEL JOB ID 214(2) | IMAGE ID 216(2) | GROUND TRUTH ID 218(2) | VISION TRACK ID 220(2) | METRIC(S) 222(2) | METADATA 224(2) |
| | BOX ID 210(3) | | | | | | |
| EVALUATION ID 200(3) | LABEL JOB ID 214(3) | IMAGE ID 216(3) | GROUND TRUTH ID 218(3) | VISION TRACK ID 220(3) | METRIC(S) 222(3) | METADATA 224(3) |
| | BOX ID 210(N) | | | | | | |
| EVALUATION ID 200(N) | LABEL JOB ID 214(N) | IMAGE ID 216(N) | GROUND TRUTH ID 218(N) | VISION TRACK ID 220(N) | METRIC(S) 222(N) | METADATA 224(N) |

FIG. 2

METRIC VISUALIZATION SYSTEM FOR MODEL EVALUATION

BACKGROUND

Autonomous vehicles utilize various systems, methods, and apparatuses to traverse an environment. For instance, autonomous vehicles utilize machine-learned models to navigate through environments where other vehicles, people, buildings, and other objects may be present. In some cases, developing trained machine-learned models for use in autonomous vehicle navigation can be challenging. For instance, if a model is updated, it can be difficult to determine whether the update resulted in an improvement to the model.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates example detail of an evaluation table and a box metric table that may be stored by a database for use in, among other things, comparing metrics to evaluate performance of machine-learned models.

DETAILED DESCRIPTION

Figure 1:
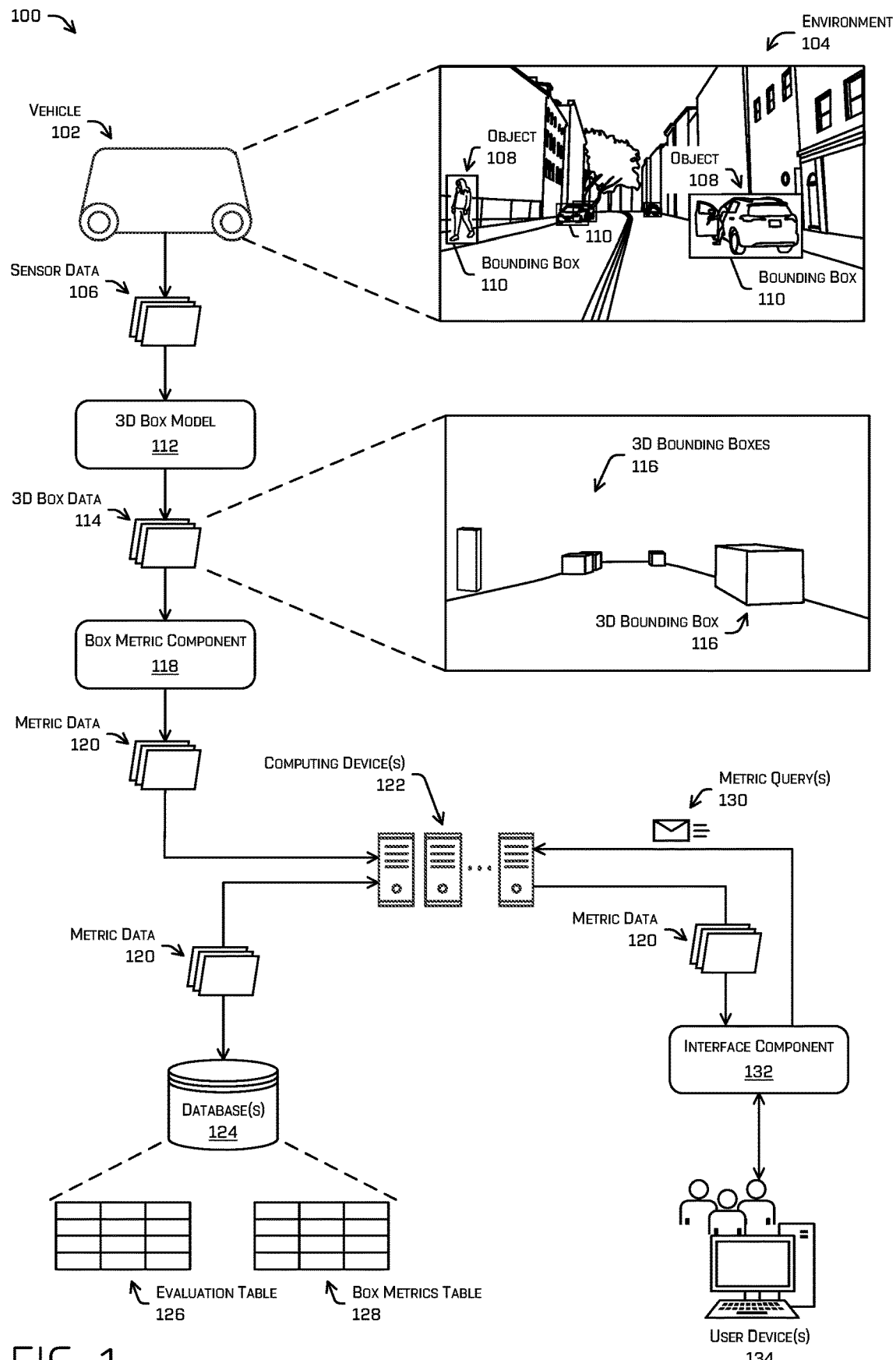
FIG. 1 is a pictorial flow diagram illustrating an example metric visualization system flow associated with evaluating a machine-learned model.

As noted above, developing trained or other machine-learned models for use in autonomous vehicle navigation can be challenging. For instance, if a model is updated, it can be difficult to determine whether the update resulted in an improvement to the model or, conversely, a regression (e.g., worsening). Take, for example, a machine-learned model that receives, as inputs, sensor data (e.g., lidar data, radar data, image data, etc.) representing an environment in which a vehicle is operating and outputs a region of interest (ROI) (e.g., two-dimensional bounding box, three-dimensional (3D) bounding box, mask, instance segmentation, semantic segmentation, scaled anchor, etc.) associated with an object detected in the environment. In some instances, updates may be made to the machine-learned model to enhance the performance of the model. Such updates can include updated model components, updated model or component software, re-training the model with a new or different dataset, and the like. When an update is made, the performance of the updated model may be tested using a validation or baseline dataset. However, minor differences in validation datasets and/or quirks in metric computations may make the results difficult to interpret whether the model has improved or regressed, especially as improvements become less significant (e.g., as the model improves and outputs become closer to ground truth, updates may render minimal improvements).

Described herein are techniques associated with determining whether a machine-learned model has improved or regressed in response to an update. In some examples, a database may be used to store metric data (e.g., differences between a model output and a ground truth) associated with outputs from a machine-learned model, and the metric data may be used to compare different models and/or determine whether an update to a model has resulted in an improvement or regression. As an example, the database may store, individually in a table, first metric data associated with a first output of a first machine-learned model and second metric data associated with a second output of a second machine-learned model. Based on an association between the first output and the second output (e.g., the first output and the second output are based on a common input, for instance) a difference may be determined between the first metric data and the second metric data, and a visualization of the difference may be presented on a graphical user interface. That is, the visualization of the difference may indicate which one of the first output or the second output was closer to the ground truth.

By way of example, and not limitation, a method according to this disclosure may include techniques of storing, in a database, metric data associated with ROIs (e.g., bounding boxes) determined by machine-learned models that are configured for use in a vehicle (e.g., a non-autonomous, semi-autonomous, or fully-autonomous vehicle). For example, bounding boxes may be determined by the machine-learned models based on input sensor data representing an environment in which the vehicle is operating. The environment may include one or more objects (e.g., cars, cyclists, pedestrians, buildings, animals, debris, construction obstacles, etc.), and an individual bounding box may be associated with and/or representative of an object. Additionally, in some examples, individual bounding boxes may be associated with a distractors (e.g., steam, fog, dust, vapor, heavy rain/snow, etc.), as well as open vehicle doors or other protrusions. In at least one example, the input sensor data may be a validation or test dataset that is associated with evaluating performance of machine-learned models.

As used herein, a "metric" associated with an ROI may represent a difference or error between a detected feature of the ROI and a ground truth. For instance, if the ROI is a bounding box associated with an object, a metric may represent differences in size (e.g., length, width, height, volume, area, etc.), orientation (e.g., yaw), point segmentation, intersection over union (IOU) of the bounding box to a ground truth bounding box or to another bounding box generated by a different model, distance from vehicle (e.g., 10, 20, 30 meters or other units of measure), trajectory, and the like. In some examples, the metric data stored in the database may include, at the least, first metric data associated with a first bounding box determined by a first machine-learned model. The first metric data may include one or more individual metrics, such as a first metric that is indicative of a first difference between the first bounding box and a ground truth bounding box. Additionally, in some examples, the metric data may also include second metric data associated with a second bounding box determined by a second machine-learned model. In at least one example, the second machine-learned model is an updated version of the first machine-learned model. Similar to the first metric data, the second metric data may include one or more individual metrics, such as a second metric that is indicative of a second difference between the second bounding box and the ground truth bounding box.

In some examples, individual metrics may be categorized and/or consolidated to show relative improvements and/or regressions. For instance, rather than looking at a single metric associated with a difference between a single bounding box and a corresponding ground truth, multiple metrics may be combined and/or normalized to determine whether a model has improved or regressed over a range of outputs. As an example, metrics associated with detecting buses in an environment of the vehicle may be combined, averaged, normalized, etc. to determine whether the machine-learned model has improved with respect to detecting buses.

In some examples, the metric data stored in the database may be stored within one or more tables such that all of the metric data associated with a single model output, such as a bounding box, is stored in an individual row of a table. For instance, in at least one example, the first metric data may be stored in the table within a first row that corresponds with the first bounding box and the second metric data may be stored in the table within a second row that corresponds with the second bounding box. Further detail of the one or more tables that may be stored in the database are described below with respect to FIGS. 1 and 2.

In some examples, the techniques may also include receiving, via a graphical user interface, an input indicating a request to evaluate the first machine-learned model and the second machine-learned model. Based at least in part on the input, a backend server component may determine an association between the first bounding box and the second bounding box. In at least one example, the backend server component determines the association based at least in part on determining that the first bounding box and the second bounding box are associated with the same object. In some examples, the backend server component may calculate a difference between a first metric of the first metric data and a second metric of the second metric data based at least in part on the association. In some instance, the calculated difference between the first metric and the second metric may be "normalized" relative to other metrics (e.g., by taking an absolute value of the difference, a percentage of the difference, a failure rate normalization, failure rate per miles drive, etc.). For instance, errors may be normalized based on how frequent the error occurs per number of miles driven (e.g., once per mile, twice per mile, once per two miles, etc.).

In some examples, the techniques may include causing presentation, on the graphical user interface, of a visualization or other representation of the difference between the first metric and the second metric. The visualization/representation of the difference may be indicative of whether the second machine-learned model improved or regressed relative to the first machine-learned model. In at least one example, if the second machine-learned model has improved relative to the first, then the techniques may include sending the second machine-learned model to one or more vehicles of a fleet of vehicles.

In some examples, different metrics may be computed based on different subsets of object detections and object classifications. For instance, a first metric may be computed for detected pedestrians who are 40 meters away from the vehicle, a second metric may be computed for detected pedestrians who are 30 meters away from the vehicle, a third metric may be computed for detected vehicles that are 10 meters away from the vehicle, and so forth. The different metrics may then be sorted in order of error significance.

In some instances, custom filters may be applied to determine more information for a metric subset. For instance, a first filter may be applied to determine a first subset of metrics associated with other vehicles that are detected at a range of 40-50 meters away from the vehicle. In some examples, additional filters may be applied to the first subset to determine a second subset of metrics for when, for instance, the yaw error of the detected vehicles is greater than 30 degrees, fewer than 30 lidar points are associated with the detected vehicle, vehicles between 40-45 meters, and the like. Additionally, even more filters may be applied to determine additional subsets (e.g., 3, 4, 5, etc.). In some instances, specific simulation examples associated with specific subsets of metrics may also be provided. For instance, continuing the above example, a simulation example associated with the vehicle may be presented for the cases where fewer than 30 lidar points are associated with the detected vehicle. In some examples, filters that may be applied to the metrics may include class of object (pedestrian, car, bus, truck, animal, debris, cyclist, etc.), distance or range of the object (e.g., 0-10 meters from vehicle, 10-20 meters from vehicle, or any specified distance), number of lidar points associated with an object, time of day, static or dynamic object, speed of the object, size of the object, whether the object was occluded, and the like.

According to the techniques described herein, the insight into the performance of machine-learned models can be improved. For instance, the techniques disclosed allow for visualization of all model outputs on a track level such that metrics for two different models can be compared for a same ground truth. Additionally, the storage and visualization techniques disclosed enable the parsing or filtering of metrics associated with model outputs by various combinations of features, such as class, distance, ground truth, model ID, sensor input ID, and the like. That is, by strategically storing metric data associated with model outputs in one or more database tables such that the metric data can be easily identified and/or recalled, more effective comparisons between different models and/or updates can be realized. Furthermore, by generating robust visualizations of metric improvements and/or regressions based on comparisons, models can be updated and/or trained with more insight, allowing for machine-learned models to reach greater accuracy and effectiveness. In the context of autonomous vehicles, the techniques described herein can increase the safety of autonomous vehicles by increasing the accuracy of the perception, prediction, and/or planning components of an autonomous vehicle, which can promote safer decision making in safety critical environments. In other words, the techniques may improve the accuracy with which the autonomous vehicle detects an object, predicts behavior of the object, and determines a trajectory for controlling the autonomous vehicle. These and other improvements will be readily apparent to those having ordinary skill in the art.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. For example, the techniques can be utilized in an aviation or nautical context, or in other machine-learning and training contexts. Additionally, the techniques described herein can be used with real data (e.g., captured using sensor(s)), simulated data (e.g., generated by a simulator), or any combination of the two. Further, although the examples described in the figures are with respect to machine-learned model outputs that include bounding boxes, other outputs are contemplated. In the figures, like numbers represent like elements.

FIG. 1 is a pictorial flow diagram illustrating an example metric visualization system flow 100 associated with evaluating a machine-learned model. In at least one example, the system flow 100 may be performed by one or more computing devices onboard a vehicle 102, such as an autonomous vehicle, or by computing device(s) 122 (e.g., server in a data center) that is accessible by the vehicle 102 and/or end devices. In addition, the computing device(s) 122 can include components for controlling the vehicle 102. Additional details associated with the vehicle 102 and the computing device(s) and/or component(s) associated therewith are described below with reference to FIG. 8.

In at least one example, the vehicle 102 may be associated with one or more sensor components. In at least one example, the sensor component(s) may capture sensor data 106 associated with an environment 104 surrounding the vehicle 102. The environment may include objects 108 (e.g., vehicles, pedestrians, cyclists, etc.) and, in some instances, the vehicle 102 may detect bounding boxes 110 associated with those objects 108. In at least one example, the sensor component(s) may include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. The sensor component(s) may generate sensor data 106, which may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In at least one example, the sensor data 106 may be provided to a 3D box model 112 (machine-learned model) that is onboard the vehicle 102 or running on the computing device(s) 122. The 3D box model 112 may generate 3D box data 114 based at least in part on the input sensor data 106. The 3D box data 114 may include one or more 3D bounding boxes 116 associated with the objects 108 in the environment 104 that are represented in the sensor data 106. For instance, the 3D box model may receive the sensor data 106 and process the sensor data 106, for example, using one or more machine learned models (e.g., using one or more neural networks, such as a residual neural network, a fully connected neural network, or the like), one or more image processing techniques, a combination of the foregoing, or the like to generate the 3D box data 114.

The 3D box data 114 may be provided to a box metric component that is running on board the vehicle 102 or on the computing device(s) 122. The box metric component 118 may calculate or otherwise determine metric data 120 based at least in part on the 3D box data 114. That is, the box metric component 118 may compute metrics associated with the 3D bounding boxes 116 included in the 3D box data 114. Metrics may represent differences between one of the 3D bounding boxes 116 and a ground truth bounding box associated with an object 108, such as differences in size (e.g., length, width, height, volume, area, etc.), orientation (e.g., yaw), point segmentation, intersection over union (IOU), distance from vehicle 102 (e.g., 10, 20, 30 meters or other units of measure), trajectory, and the like.

In some examples, the one or more computing device(s) 122 may represent a backend server system. Although depicted in FIG. 1 as separate components for ease of illustration and understanding, it is contemplated that the 3D box model 112, the box metric component 118, and the interface component 132 may be hosted on the computing device(s) 122. The one or more computing device(s) 122 may receive the metric data 120 and store the metric data 120 in one or more database(s) 124. In some examples, the database(s) 124 may store one or more tables, such as an evaluation table 126 and a box metrics table 128. The evaluation table 126 may record data associated with machine-learned model evaluations and/or experiments. The box metrics table 128 may store metrics and/or metadata for every 3D bounding box 116 outputted in a model evaluation and/or experiment, as well as other machine-learned model outputs. Additional detail regarding the evaluation table 126 and the box metrics table 128 is discussed below in the description of FIG. 2.

In some examples, the computing device(s) 122 may receive one or more metric queries 130 from the interface component 132. As an example, the interface component 132 may cause presentation of a graphical user interface (e.g., an accessible web application) on the user device(s) 134, and an input may be received via the graphical user interface indicating a request to view one or more metrics associated with a machine-learned model evaluation/experiment. As such, the interface component 132 may send the metric queries 130 to the computing device(s) 122, and the computing device(s) 122 may obtain the queried metric data 120 from the database(s) 124, and then forward the queried metric data 120 to the interface component 132. The interface component 132 may use the metric data 120 to generate a visualization of differences between metrics computed for different machine-learned model outputs, as well as differences between the outputs and ground truths, and then cause presentation of the visualizations on the graphical user interface such that the user device(s) 134 may view the visualizations.

FIG. 2 illustrates example detail of an evaluation table 126 and a box metric table 128 that may be stored by a database for use in, among other things, comparing metrics to evaluate performance of machine-learned models. The evaluation table 126 may record data associated with machine-learned model evaluations and/or experiments. In some examples, an evaluation identifier 200(1)-200(N) corresponding with a specific machine-learned model evaluation may be uniquely identified based on a combination of one or more of a Git_Sha identifier 202(1)-202(N), a validation dataset identifier 204(1)-204(N), a model path identifier 206(1)-206(N), and an evaluation parameters path identifier 208(1)-208(N).

The box metrics table 128 may store metrics 222(1)-222(N) and/or metadata 224(1)-(224(N) for every 3D bounding box 116 outputted in a model evaluation and/or experiment, as well as other machine-learned model outputs. In some examples, a box identifier 210(1)-210(N) associated with each output bounding box 116 may be uniquely identified based on a combination of one or more of the evaluation identifier 200(1)-200(N), a scale job identifier 214(1)-214(N), an image identifier 216(1)-216(N), a ground truth identifier 218(1)-218(N), and a vision track identifier 220(1)-220(N). In some examples, the metric(s) 222(1) for a given bounding box may include multiple metrics (e.g., 30, 40, 50, etc.). In some examples, the metadata 224(1)-224(N) may include data indicative of a class (e.g., car, bus, truck, pedestrian, cyclist, etc.) associated with a bounding box, a distance of the bounding box relative to the vehicle, and the like.

Figure 3:
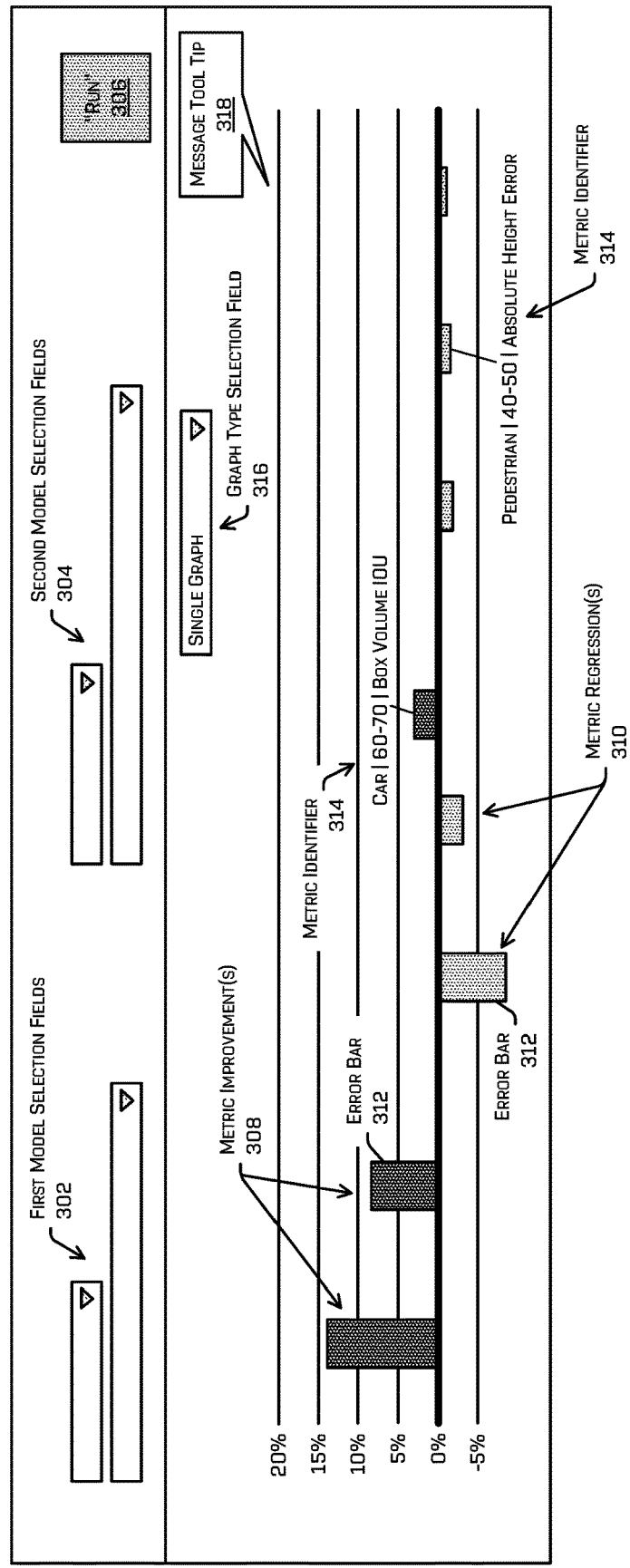
FIG. 3 illustrates an example graphical user interface for presenting visualizations of metrics for evaluation of machine-learned models.

FIG. 3 illustrates an example graphical user interface 300 for presenting visualizations of metrics for evaluation of machine-learned models. The example graphical user interface 300 may include first model selection fields 302 and second model selection fields 304. The first model selection fields 302 and the second model selection fields 304 may be used to select different machine-learned models for metric comparisons. The graphical user interface 300 may also include a "run" input 306 that, when selected, causes the visualizations associated with the metrics to be displayed on the graphical user interface 300.

In some examples, visualizations of metric improvements 308 and metric regressions 310 may be represented with error bars 312. The error bars 312 that are indicative of a metric improvement 308 may be of a first color (e.g., green), stippling, shading, transparency, or the like, and the error bars 312 that are indicative of a metric regression 310 may be of a second color (e.g., red), stippling, shading, transparency, or the like. A magnitude of an error bar 312 may represent a difference in calculated metrics for a first selected model relative to a second selected model and/or relative to a ground truth. For instance, the error bar 312 that is associated with the car, box volume IOU, as indicated by the metric identifier 314, can be interpreted to represent that, can be interpreted to represent that the second model made roughly a 3% improvement over the first model with respect to detecting car box volume IOU. In some examples, the graphical user interface 300, by default, may display the top metric differences between the selected first machine-learned model and the selected second machine-learned model, including both improvements and regressions. Additionally, or alternatively, filters may be applied such that the graphical user interface 300 displays specific classes or types of metrics and/or metadata. For instance, a filter may be applied such that only metrics associated with bounding boxes corresponding with cars are shown.

Figure 4:
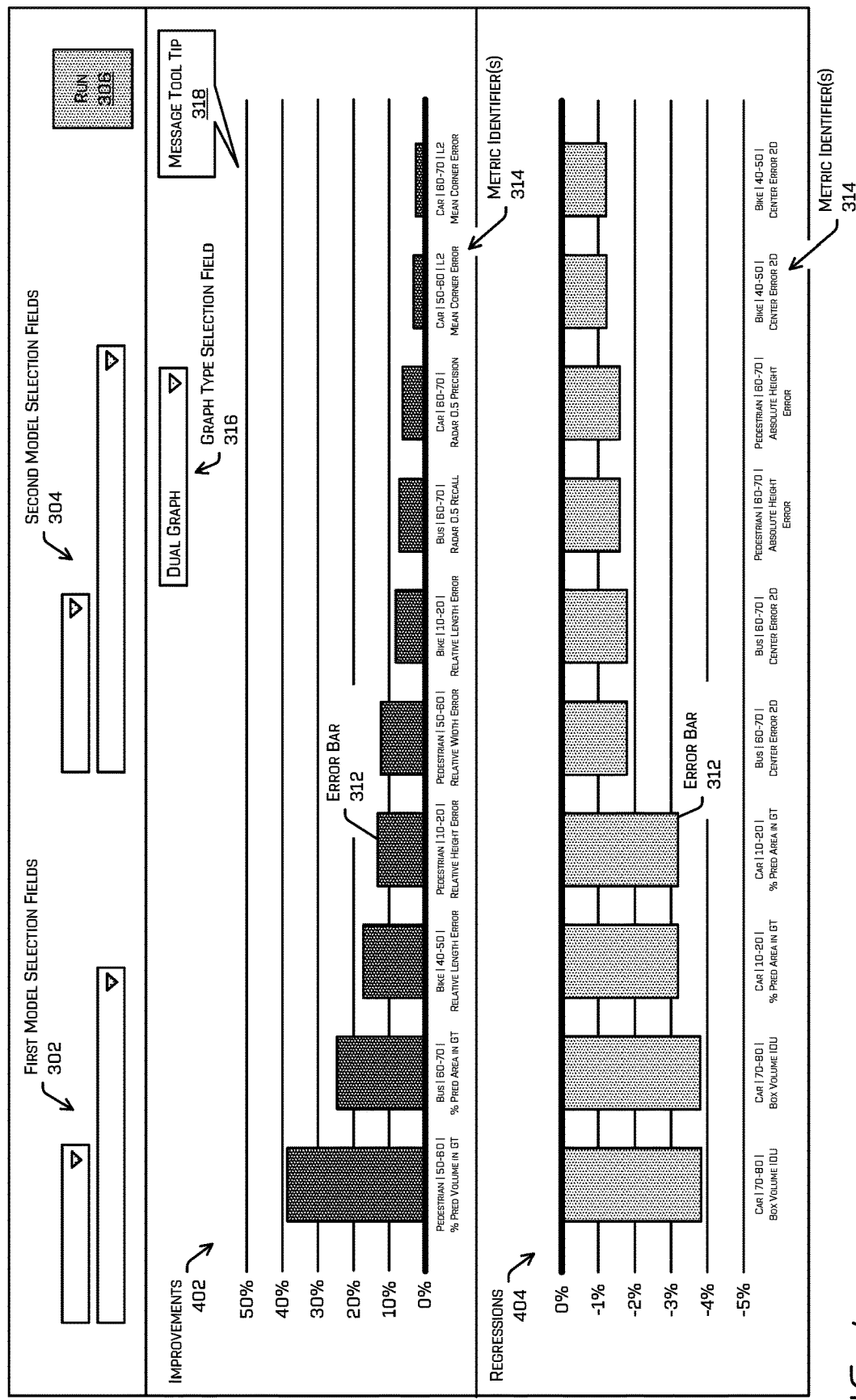
FIG. 4 illustrates another example graphical user interface for presenting visualizations of metrics for evaluation of machine-learned models.

The graphical user interface 300 may also include a graph type selection field 316 that allows users to select between different versions of the displayed graph. For instance, the graph type selected and depicted in FIG. 3 is a "single graph" type, and a "dual graph" type is shown in FIG. 4. The graphical user interface 300 may also include a message tool tip 318 that can display additional information associated with the graph. For instance, an example message that may be displayed in the pop-up message tool tip 318 may be to "scroll for more results," to "hover a cursor over an error bar for more information," as well as other informational messages.

In some examples, the error bars 312 may be organized based on order of magnitude of improvement and/or regression based on a difference between current results and/or differences between two machine-learned models. For instance, when comparing two machine-learned models, the error bars 312 may be organized in order of greatest error magnitude to least error magnitude (or vice versa). Additionally, in some instances, the error bars 312 may include one or more noise threshold indicators indicating whether a magnitude of an error bar 312 is associated with an insignificant change between machine-learned models that may be within the noise. In some examples, the magnitude of the error bars 312 may be normalized with respect to other error bars 312.

FIG. 4 illustrates the example graphical user interface 300 for presenting visualizations of metrics for evaluation of machine-learned models. In FIG. 4, the graph type selection field 316 has been changed such that "dual graph" type is selected. As such, the user interface displays two graphs, one graph that includes metric improvements 402 and another graph that includes metric regressions 404. The metric identifiers 314 for the different error bars 312 may be positioned below the error bars 312.

Figure 5:
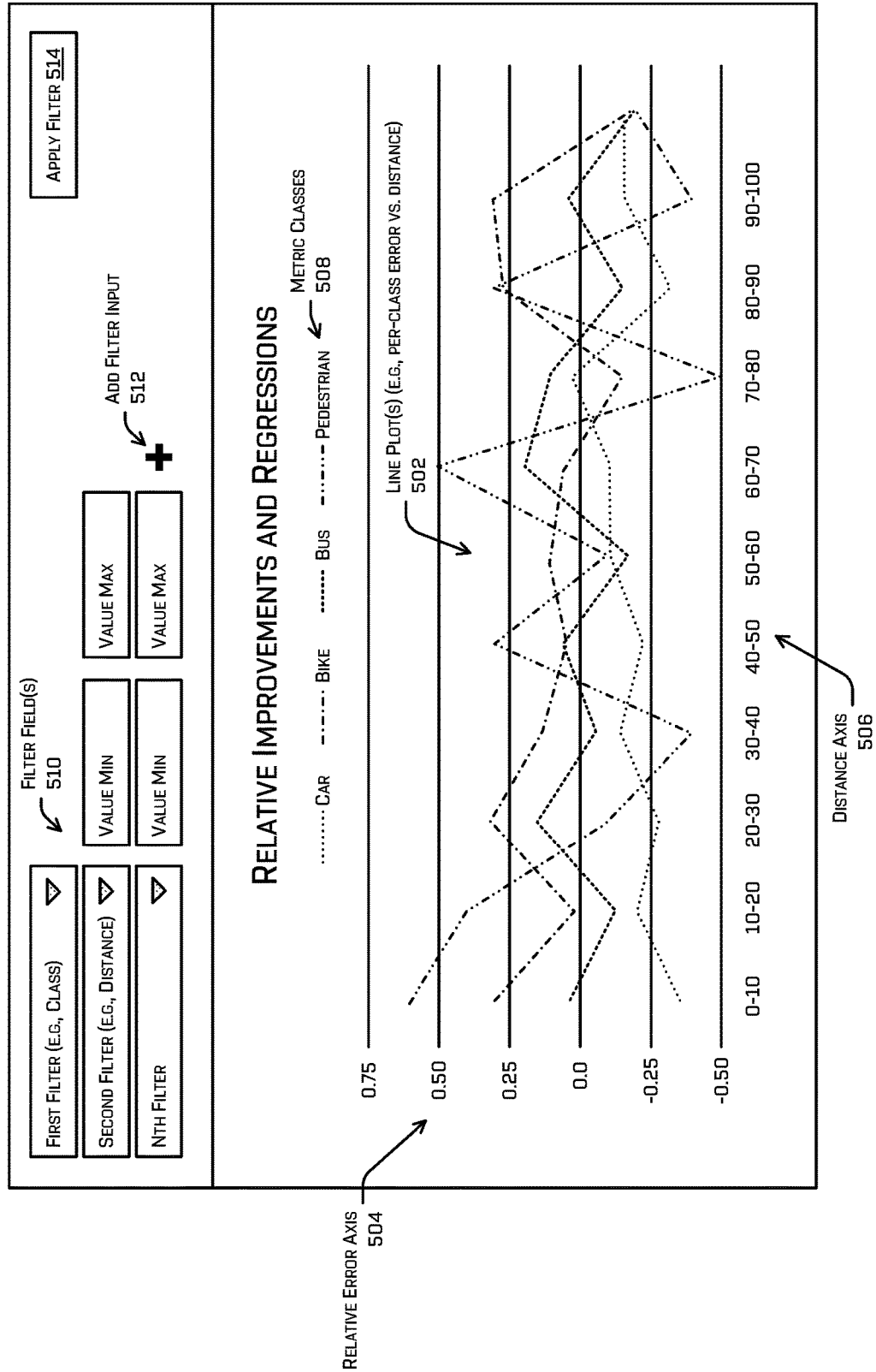
FIG. 5 illustrates yet another example graphical user interface for presenting visualizations of metrics for evaluation of machine-learned models.

FIG. 5 illustrates another example graphical user interface 500 for presenting visualizations of metrics for evaluation of machine-learned models. The graphical user interface 500 includes one or more line plot(s) 502. The line plot(s) 502 may be based off the calculated metric data and be graphed such that the relative error is plotted against distance of the object from the vehicle. For a given point on a line plot 502, the relative error and distance values can be determined based on the values at which the point intersects the relative error axis 504 and the distance axis 506. Additionally, different lines for the line plot(s) 502 may be used for different filters applied by a user, such as metric class. For instance, the metric classes 508 associated with the different line plot(s) 502 are shown above the graph.

The graphical user interface 500 may include one or more filter field(s) 510, which may allow users to filter the data shown on the graph by class and/or by metric. In some examples, multiple filters may be applied and additional filter field(s) 510 may be displayed on the graphical user interface 500 if the add filter input 512 is selected. Additionally, the graphical user interface 500 may include an "apply filter" 514 input that, when selected, filters the metric data used to generate the plot(s) 502 to what is specified by a user.

Figure 6A:
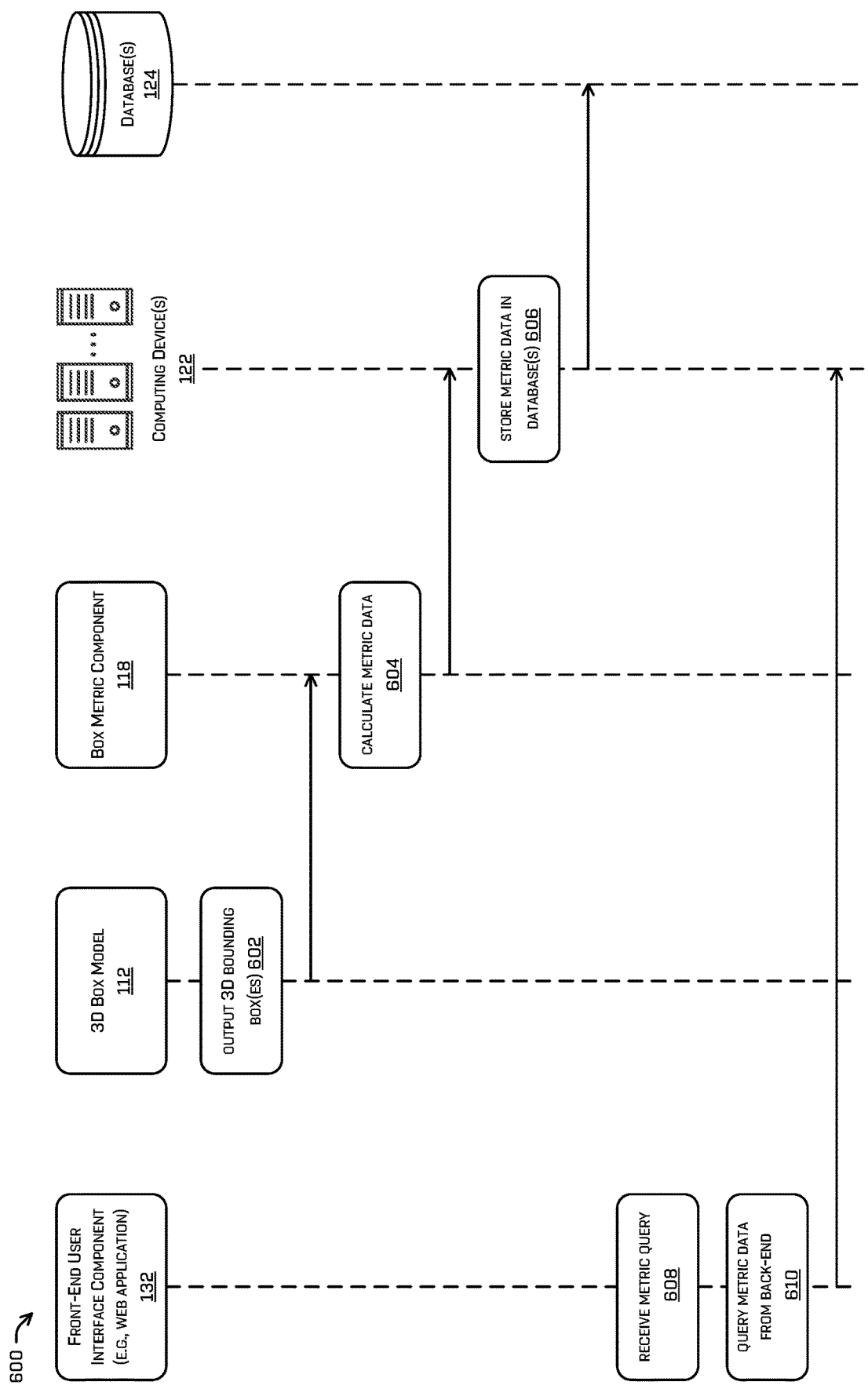
FIGS. 6A and 6B are flow diagrams that collectively illustrate an example process associated with evaluating performance of a machine-learned model based on metric data.
Figure 6B:
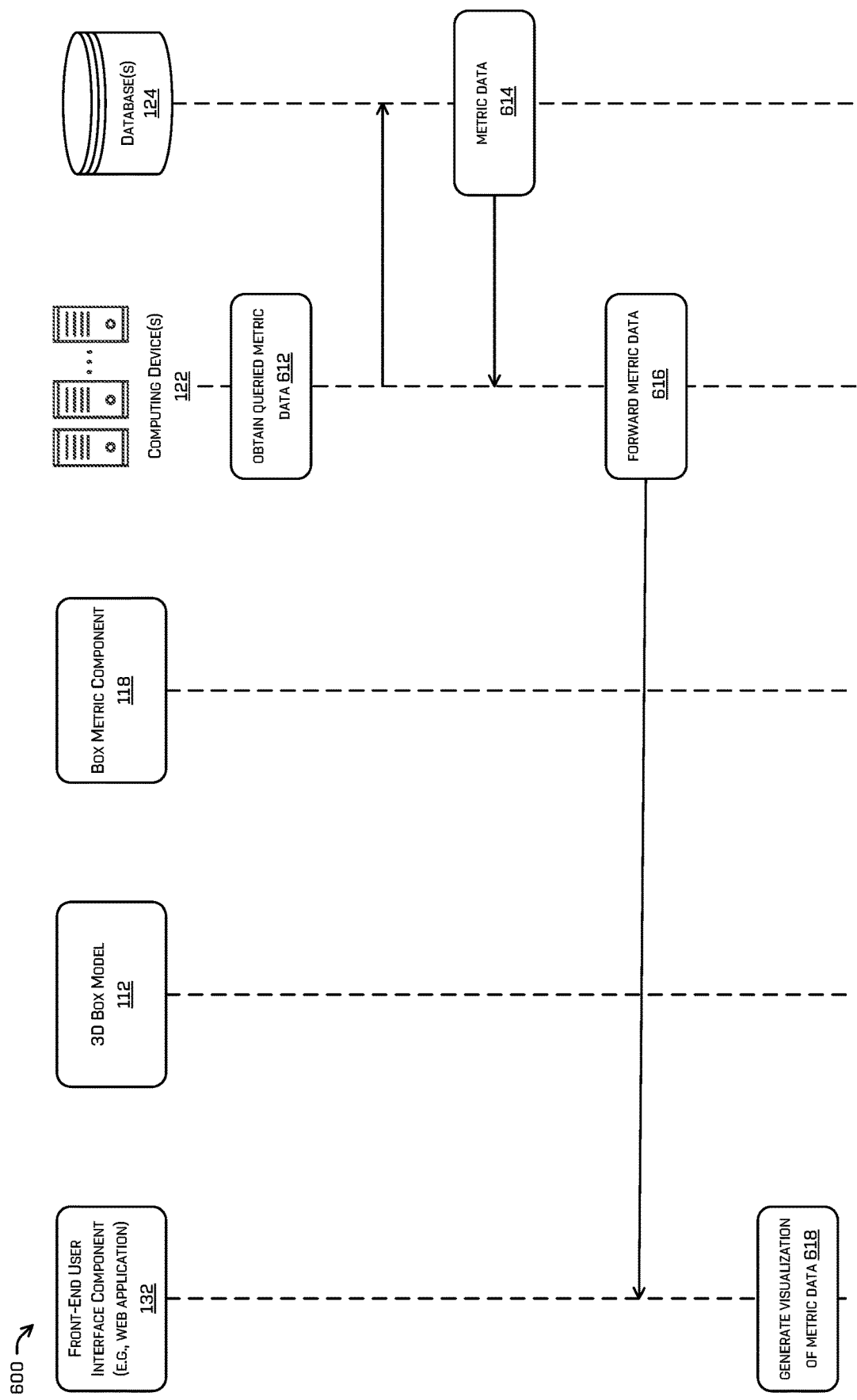

FIGS. 6A and 6B are flow diagrams that collectively illustrate an example process 600 associated with evaluating performance of a machine-learned model based on metric data. At operation 602, the 3D box model 112 may output one or more 3D bounding boxes. The bounding boxes may be determined by the 3D box model 112 based on input sensor data representing an environment in which a vehicle is operating. The environment may include one or more objects (e.g., cars, cyclists, pedestrians, buildings, etc.), and an individual bounding box may be associated with and/or representative of an object. In at least one example, the input sensor data may be a validation or test dataset that is associated with evaluating performance of machine-learned models.

The 3D bounding boxes may be received by a box metric component 118, and at operation 604, the box metric component 118 may calculate metric data associated with the bounding boxes. In some examples, a metric associated with a bounding box may represent a difference or error between a detected feature of the bounding box and a ground truth bounding box, such as differences in size (e.g., length, width, height, volume, area, etc.), orientation (e.g., yaw), point segmentation, intersection over union (IOU), distance from vehicle (e.g., 10, 20, 30 meters or other units of measure), trajectory, and the like. In at least one example, the ground truth bounding box and its corresponding features and/or characteristics may be determined and/or generated by a human, a trained machine-learned model, or a computing device.

At operation 606, the computing device(s) 122 (e.g., a backend server) may store the metric data in one or more database 124. In some examples, the metric data stored in the database 124 may include, at the least, first metric data associated with a first bounding box determined by the 3D box model 112. Additionally, in some examples, the metric data may also include second metric data associated with a second bounding box determined by another 3D box model. In at least one example, the other 3D box model is an updated version of the 3D box model 112.

In some examples, the metric data stored in the database(s) 124 may be stored within one or more tables such that all of the metric data associated with a single model output, such as a bounding box, is stored in an individual row of a table. For instance, in at least one example, the first metric data may be stored in the table within a first row that corresponds with the first bounding box and the second metric data may be stored in the table within a second row that corresponds with the second bounding box.

At operation 608, the interface component 132 may receive a metric query. For instance, the metric query may be received from a user. In some examples, the interface component 132 may be a web-based application that is accessible to user devices over a network. In response to receive the query, at operation 610, the interface component 132 may query the metric data from the computing device(s) 122.

At operation 612, in response to receiving the query, the computing device(s) 122 may obtain the queried metric data from the database(s) 124. For instance, based on data included in the query indicating which metrics associated with which model outputs are requested, the computing device(s) 122 may request the metric data from one of the tables of the database(s) 124, such as the evaluation table or the box metrics table.

At operation 614, the computing device(s) 122 may receive the requested metric data from the database(s) 124 and, at operation 616, may forward the requested metric data to the interface component 132. At operation 618, the interface component 132 may generate a visualization of the metric data. For instance, the visualization may represent an improvement or regression associated with the 3D box model 112.

Figure 7:
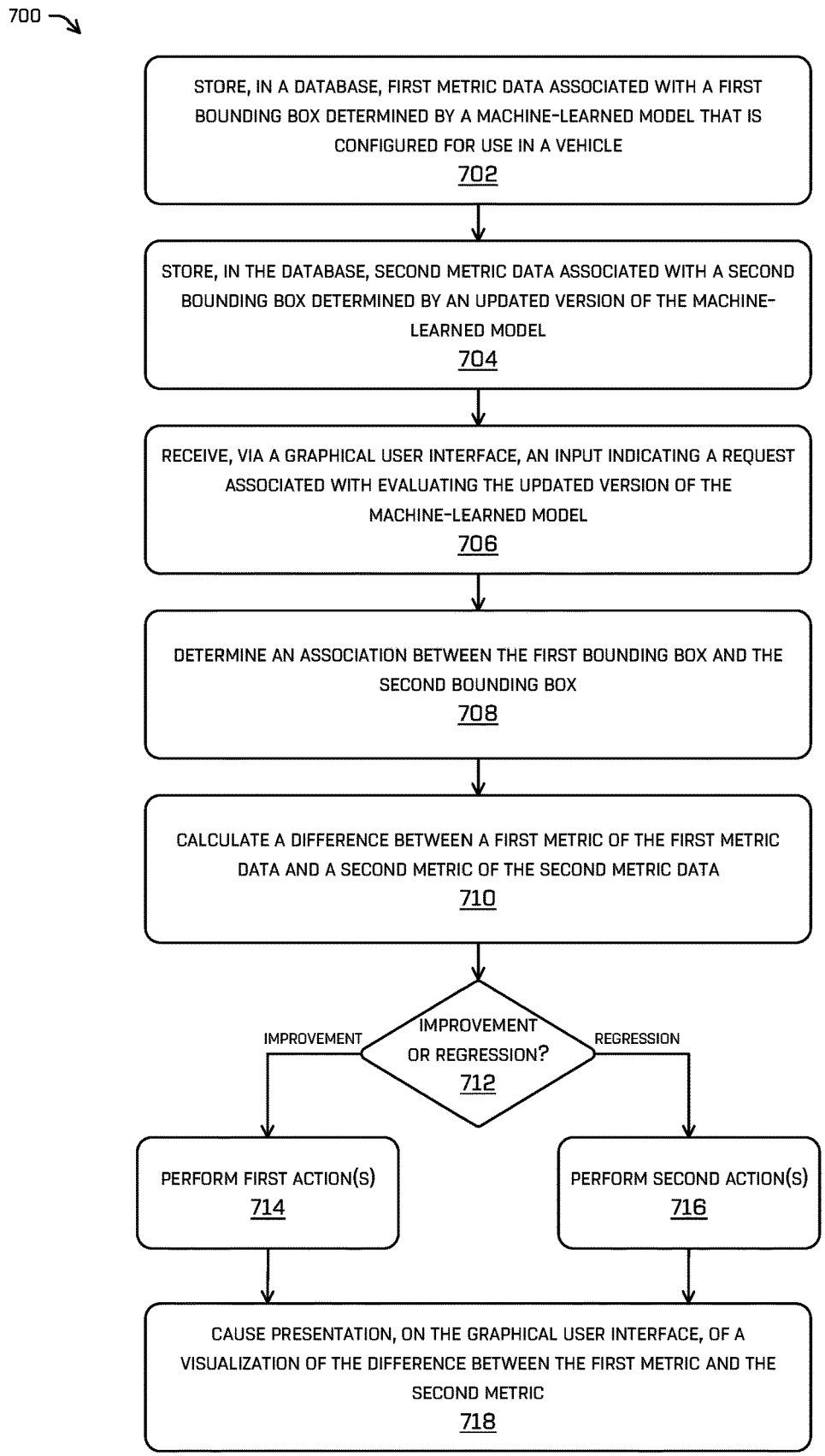
FIG. 7 is a flowchart illustrating an example process associated with evaluating performance of a machine-learned model based on metric data.

FIG. 7 is a flowchart illustrating an example process 700 associated with evaluating performance of a machine-learned model based on metric data. By way of example, the process 700 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 700. In some examples, multiple branches represent alternate implementations that may be used separately or in combination with other operations discussed herein. The process 700 illustrated may be described with reference to components and elements described above with reference to FIG. 1 for convenience and ease of understanding. However, the process 700 is not limited to being performed using these components, and the components are not limited to performing the process 700.

The process 700 begins at operation 702, which includes storing, in a database, first metric data associated with a first bounding box determined by a machine-learned model that is configured for use in a vehicle. For instance, the computing device(s) 122 may store, in the database(s) 124, the first metric data associated with a first 3D bounding box 116 determined by the 3D box model 112. The first bounding box may correspond with a first object 108 in the environment 104.

At operation 704, the process 700 includes storing, in the database, second metric data associated with a second bounding box determined by an updated version of the machine-learned model. For instance, the computing device(s) 122 may store, in the database(s) 124, the second metric data associated with a second 3D bounding box 116 determined by an updated version of the 3D box model 112. The second bounding box may correspond with the first object 108 in the environment 104.

At operation 706, the process 700 includes receiving, via a graphical user interface, an input indicating a request associated with evaluating the updated version of the machine-learned model. For instance, the computing device(s) 122 may receive a metric query 130 from a user device 134 via the interface component 132. The request may indicate specific metrics that are to be returned for specific models.

At operation 708, the process 700 includes, determining an association between the first bounding box and the second bounding box. In some examples, determining the association may be based at least in part on the input. In some examples, the computing device(s) 122 may determine the association based on the first bounding box and the second bounding box being associated with a same object 108 in the environment 104. For instance, the metric data may be stored in the box metrics table and include an indication that the metrics are associated with a same object.

At operation 710, the process 700 includes calculating a difference between a first metric of the first metric data and a second metric of the second metric data. In some examples, the difference may be calculated based at least in part on the association. For instance, because the bounding boxes associated with the first metric data and the second metric data correspond with a same object, the computing device(s) 122 or the interface component may calculate the difference.

At operation 712, the process 700 includes determining whether the difference is associated with an improvement or regression of the second machine-learned model. If the difference is associated with an improvement, the process 700 proceeds to operation 714. However, if the difference is associated with a regression, the process 700 proceeds to operation 716.

At operation 714, the process 700 includes performing one or more first actions. For instance, because the difference is associated with an improvement of the second machine-learned model, the first action may include transmitting the second machine-learned model to a vehicle of a fleet of vehicles. Additionally, or alternatively, the first action may include storing an indication that the second machine-learned model has improved, identifying an updated component of the second machine-learned model that resulted in the improvement, storing the difference in the evaluation table 126, and the like.

At operation 716, the process 700 includes performing one or more second actions. For instance, because the difference is associated with a regression of the second machine-learned model, the second action may include refraining from transmitting the second machine-learned model to the vehicle of the fleet of vehicles. Additionally, or alternatively, the second action may include storing an indication that the second machine-learned model has regressed, identifying an updated component of the second machine-learned model that resulted in the regression, storing the difference in the evaluation table 126, and the like.

At operation 718, the process 700 includes causing presentation, on the graphical user interface, of a visualization of the difference between the first metric and the second metric. For instance, the computing device(s) 122 may cause the interface component 132 to present the visualization of the difference between the first metric and the second metric to the user device(s) 134. In some examples, the visualization may be indicative of whether the metric has improved or regressed based on the updated version of the machine-learned model.

Figure 8:
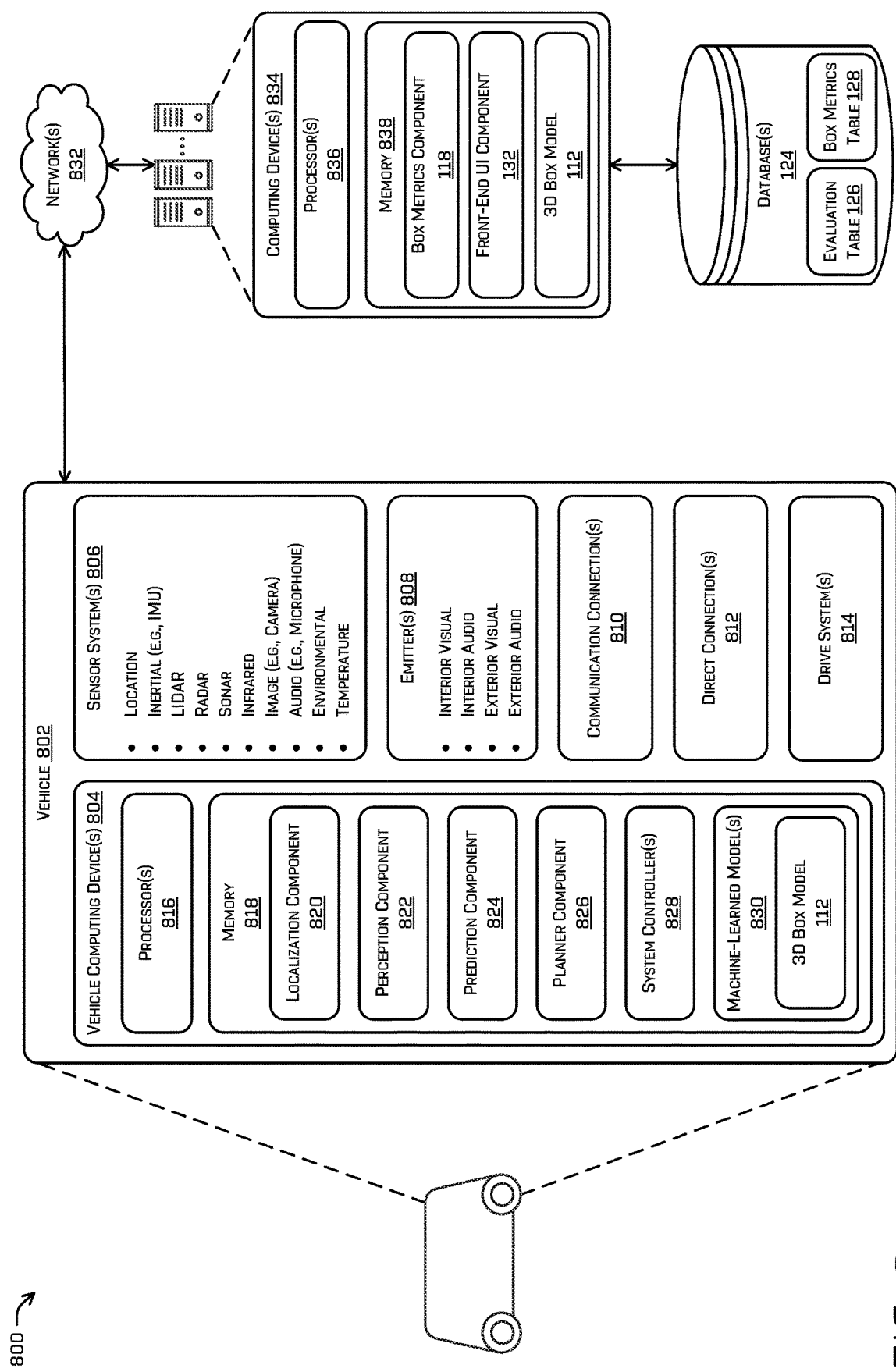
FIG. 8 is a block diagram illustrating an example system that may be used for performing the techniques described herein.

FIG. 8 is a block diagram illustrating an example system 800 that may be used for performing the techniques described herein. In at least one example, a vehicle 802, which can correspond to the vehicle 102 described above with reference to FIG. 1, can include one or more vehicle computing devices 804, one or more sensor systems 806, one or more emitters 808, one or more communication connection(s) 810, at least one direct connection 812, and one or more drive systems 814.

In at least one example, a vehicle 802 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 802 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 802 is an autonomous vehicle; however, the vehicle 802 could be any other type of vehicle. While only a single vehicle 802 is illustrated in FIG. 8, in a practical application, the example system 800 can include a plurality of vehicles, which, in some examples, can comprise a fleet of vehicles.

The vehicle computing device(s) 804 can include processor(s) 816 and memory 818 communicatively coupled with the processor(s) 816. In the illustrated example, the memory 818 of the vehicle computing device(s) 804 stores a localization component 820, a perception component 822, a prediction component 824, a planning component 826, one or more system controllers 828, and one or more machine-learned models 830.

In at least one example and as described above, the localization component 820 can determine a pose (position and orientation) of the vehicle 802 in relation to a local and/or global map based at least in part on sensor data received from the sensor component(s) 806 and/or map data associated with a map (e.g., of the map(s)). In at least one example, the localization component 820 can include, or be associated with, a calibration component that is capable of performing operations for calibrating (determining various intrinsic and extrinsic parameters associated with any one or more of the sensor component(s) 806), localizing, and mapping substantially simultaneously.

In at least one example, the perception component 822 can perform object detection, segmentation, and/or classification based at least in part on sensor data received from the sensor component(s) 806. In at least one example, the perception component 822 can receive raw sensor data (e.g., from the sensor component(s) 806). In at least one example, the perception component 822 can receive sensor data and can utilize one or more processing algorithms to perform object detection, segmentation, and/or classification with respect to object(s) identified in the sensor data. In some examples, the perception component 822 can associate a bounding region (or otherwise an instance segmentation) with an identified object and can associate a confidence score associated with a classification of the identified object with the identified object. In some examples, objects, when rendered via a display, can be colored based on their perceived class. In some examples, the perception component 822 may utilize one or more of the machine-learned models 830, such as the 3D box model 112, to determine a bounding box associated with a detected object.

The prediction component 824 can receive sensor data from the sensor component(s) 806, map data associated with a map (e.g., of the map(s) which can be in storage 330), and/or perception data output from the perception component 822 (e.g., processed sensor data), and can output predictions associated with one or more objects within the environment of the vehicle 802. Predictions can include predicted trajectories associated with objects in the environment in which the vehicle 802 is operating.

The planning component 826 may receive data, information, and/or outputs from the localization component 820, the perception component 822, and the prediction component 824, may generate one or more proposed vehicle operations (e.g., proposed trajectories). Additional details of localization components, perception components, prediction components, and/or planning components that are usable can be found in U.S. Patent No. 9,812,123, issued on Apr. 4, 2017, and U.S. Pat. No. 10,353,390, issued on Jul. 16, 2019, the entire contents of both of which are incorporated by reference herein in their entirety and for all purposes. In some examples (e.g., where the vehicle 802 is not an autonomous vehicle), one or more of the aforementioned components can be omitted from the vehicle 802.

In at least one example, the vehicle computing device(s) 804 can include one or more system controller(s) 828, which can be configured to control steering, propulsion, braking, safety, emitters, communication, and other systems of the vehicle 802. These system controller(s) 828 can communicate with and/or control corresponding systems of the drive system(s) 814 and/or other systems of the vehicle 802.

The machine-learned models 830 may include models for detecting bounding boxes of objects in an environment of the vehicle 802, such as the 3D box model. Additionally, the machine-learned models 830 may include models for generating or determining other outputs, such as poses of objects, trajectories of objects, occlusions, optimal trajectories for the vehicle 802, system and/or component health, and the like. Outputs of these models may be compared using the techniques described herein to visualize metric data for validating performance of the model.

While the components described above are illustrated as "onboard" the vehicle 802, in other implementations, the components can be remotely located and/or accessible to the vehicle 802. For instance, the component can be remotely located on the computing device(s) 834 and accessible to the vehicle 802 via one or more network(s) 832. Furthermore, while the components are described above as "components," such components can comprise one or more components, which can be part of a system, for performing operations attributed to each of the components.

In at least one example, the localization component 820, the perception component 822, the prediction component 824, the planning component 826, the machine-learned models 830, etc. can process data, as described above, and can send their respective outputs over network(s) 832, to computing device(s) 834. In at least one example, the localization component 820, the perception component 822, the prediction component 824, the planning component 826, the machine-learned models 830, etc. can send their respective outputs to the computing device(s) 834 at a particular frequency, after a lapse of a predetermined period of time, in near real-time, etc.

In at least one example, the sensor component(s) 806 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 806 can provide input to the vehicle computing device(s) 804. In some examples, the sensor component(s) 806 can preprocess at least some of the sensor data prior to sending the sensor data to the vehicle computing device(s) 804. In at least one example, the sensor component(s) 806 can send sensor data, via the network(s) 832, to the computing device(s) 834 at a particular frequency, after a lapse of a predetermined period of time, in near real-time, etc.

The vehicle 802 can also include one or more emitters 808 for emitting light and/or sound, as described above. The emitter(s) 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 808 can be positioned at various locations about the exterior and/or interior of the vehicle 802.

The vehicle 802 can also include communication connection(s) 810 that enable communication between the vehicle 802 and other local or remote computing device(s). For instance, the communication connection(s) 810 can facilitate communication with other local computing device(s) on the vehicle 802 and/or the drive system(s) 814. Also, the communication connection(s) 810 can allow the vehicle to communicate with other nearby computing device(s) (e.g., other nearby vehicles, traffic signals, etc.). The communications connection(s) 810 also enable the vehicle 802 to communicate with a remote teleoperations computing device or other remote services.

The communications connection(s) 810 can include physical and/or logical interfaces for connecting the vehicle computing device(s) 804 to another computing device or a network, such as network(s) 832. For example, the communications connection(s) 810 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 812 can directly connect the drive system(s) 814 and other systems of the vehicle 802. In at least one example, the vehicle 802 can include drive system(s) 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include sensor component(s) to detect conditions of the drive system(s) 814 and/or the surroundings of the vehicle 802. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 814. In some cases, the sensor component(s) on the drive system(s) 814 can overlap or supplement corresponding systems of the vehicle 802 (e.g., sensor component(s) 806).

The drive system(s) 814 can include many of the vehicle systems, including a high voltage battery, a motor to propel the vehicle 802, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 814. Furthermore, the drive system(s) 814 also include communication connection(s) that enable communication by the respective drive system with other local or remote computing device(s).

In FIG. 8, the vehicle computing device(s) 804, sensor component(s) 806, emitter(s) 808, and the communication connection(s) 810 are shown onboard the vehicle 802. However, in some examples, the vehicle computing device(s) 804, sensor component(s) 806, emitter(s) 808, and the communication connection(s) 810 can be implemented outside of an actual vehicle (i.e., not onboard the vehicle 802).

As described above, the vehicle 802 can send data to the computing device(s) 834, via the network(s) 832. In some examples, the vehicle 802 can send raw sensor data to the computing device(s) 834. In other examples, the vehicle 802 can send processed sensor data and/or representations of sensor data to the computing device(s) 834 (e.g., data output from the localization component 820, the perception component 822, the prediction component 824, the planning component 826, the machine-learned models, etc.). In some examples, the vehicle 802 can send data to the computing device(s) 834 at a particular frequency, after a lapse of a predetermined period of time, in near real-time, etc.

The computing device(s) 834 can receive the data (raw or processed) from the vehicle 802 and/or other data collection devices, as well as data from one or more third party sources and/or systems. In at least one example, the computing device(s) 834 can include processor(s) 836 and memory 838 communicatively coupled with the processor(s) 836. In the illustrated example, the memory 838 of the computing device(s) 834 stores the box metrics component 118, the interface component 132, and the 3D box model 112. In some examples, one or more of the systems and/or components can be associated with the vehicle 802 or other computing device(s) associated with the system 800 instead of, or in addition to, being associated with the memory 838 of the computing device(s) 834.

The processor(s) 816 of the vehicle 802 and the processor(s) 836 of the computing device(s) 834 can be any suitable processor capable of executing instructions to process data and perform operations as described herein. By way of example and not limitation, the processor(s) 816 and 836 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and 838 are examples of non-transitory computer-readable media. Memory 818 and 838 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 8 is illustrated as a distributed system, in some examples, components of the vehicle 802 can be associated with the computing device(s) 834 and/or the components of the computing device(s) 834 can be associated with the vehicle 802. That is, the vehicle 802 can perform one or more of the functions associated with the computing device(s) 834, and vice versa.

Furthermore, while the vehicle computing device(s) 804 and the computing device(s) 834 are shown to include multiple components, in some examples, such components can be associated with more or fewer individual components. For example, in an example, a localization component, a perception component, a prediction component, and/or a planning component can be combined into a single component. Or, an annotation component, a training data generation component, and/or a training component can be combined into a single component. That is, while depicted as separate components, any one or more of the components can be combined.

EXAMPLE CLAUSES

A. A system comprising: one or more processors; and one or more non-transitory computer-readable media storing instructions that, when executed by the one or more processors, cause the system to perform operations comprising: storing, in a database, first metric data associated with a first bounding box, the first bounding box determined by a first machine-learned model based at least in part on input sensor data representing an environment in which a vehicle is operating; storing, in the database, second metric data associated with a second bounding box, the second bounding box determined by a second machine-learned model based at least in part on the input sensor data, wherein the second machine-learned model is an updated version of the first machine-learned model; determining that the first bounding box and the second bounding box are associated with a same object that is represented in the input sensor data; based at least in part on the first bounding box and the second bounding box being associated with the same object, calculating multiple differences between associated metrics that are included in the first metric data and the second metric data; causing presentation, on a graphical user interface, of a first visualization associated with a first portion of the multiple differences; receiving a selection of one or more of the associated metrics; and causing presentation, on the graphical user interface, of a second visualization associated with a second portion of the multiple differences, the second portion of the multiple differences corresponding with the selection.

B. The system as recited in paragraph A, the operations further comprising: determining, based at least in part on the multiple differences, that the second machine-learned model is an improvement over the first machine-learned model; and sending the second machine-learned model to a first vehicle of a fleet of vehicles based at least in part on the improvement.

C. The system as recited in any one of paragraphs A-B, wherein a first metric of the associated metrics is indicative of a first difference between the first bounding box and a ground truth bounding box associated with the same object.

D. The system as recited in any one of paragraphs A-C, wherein the associated metrics comprise at least one of: yaw metrics; point segmentation metrics; volume metrics; precision metrics; or recall metrics.

E. The system as recited in any one of paragraphs A-D, wherein: the database includes a bounding box metric table; the first metric data is stored within a first row of the bounding box metric table, the first row corresponding with the first bounding box, the first row storing at least an identifier of the first machine-learned model, an identifier of a ground truth bounding box associated with the same object, and the first metric data; and the second metric data is stored within a second row of the bounding box metric table, the second row corresponding with the second bounding box, the second row storing at least an identifier of the second machine-learned model, the identifier of the ground truth bounding box, and the second metric data.

F. A method comprising: storing, in a database, first metric data associated with a first region of interest (ROI) determined by a machine-learned model that is configured for use in a vehicle; storing, in the database, second metric data associated with a second ROI determined by an updated version of the machine-learned model; determining an association between the first ROI and the second ROI; determining a difference between the first metric data and the second metric data based at least in part on the association; and based at least in part on the difference, at least one of: causing presentation of a visualization of the difference on a graphical user interface; or sending the updated version of the machine-learned model to a first vehicle.

G. The method as recited in paragraph F, wherein the difference is indicative of an improvement associated with the updated version of the machine-learned model and the method comprises sending the updated version of the machine-learned model to the first vehicle based at least in part on the improvement.

H. The method as recited in any one of paragraphs F-G, wherein the determining the association is further based at least in part on determining that the first ROI and the second ROI are associated with a same object.

I. The method as recited in any one of paragraphs F-H, wherein the first ROI is a first bounding box and the second ROI is a second bounding box, the first bounding box and the second bounding box associated with an object in an environment of the vehicle, the object comprising at least one of another vehicle, a pedestrian, a cyclist, an animal, or a distractor.

J. The method as recited in any one of paragraphs F-I, wherein: the first metric is indicative of a first difference between the first ROI and a ground truth associated with a same object; and the second metric is indicative of a second difference between the second ROI and the ground truth.

K. The method as recited in any one of paragraphs F-J, wherein the first metric data and the second metric data include one or more of a yaw metric; a point segmentation metric; a volume metric; or a distance metric.

L. The method as recited in any one of paragraphs F-K, wherein the visualization of the difference is indicative of whether the updated version of the machine-learned model improved or retrogressed relative to the machine-learned model.

M. The method as recited in any one of paragraphs F-L, wherein the first ROI and the second ROI are determined by the machine-learned model and the updated version of the machine-learned model, respectively, based at least in part on input sensor data representing an environment in which the vehicle is operating, the input sensor data being part of a dataset that is associated with evaluating performance of machine-learned models.

N. The method as recited in any one of paragraphs F-M, wherein: determining the difference comprises determining multiple differences between metrics of the first metric data and the second metric data, the multiple differences including at least a first difference between a first metric of the first metric data and a second metric of the second metric data; and the visualization of the difference comprises a visualization of a portion of the multiple differences, the portion of the multiple differences including the first difference.

O. The method as recited in any one of paragraphs F-N, wherein: the database includes a table; the first metric data is stored within a first row of the table, the first row corresponding with the first ROI; and the second metric data is stored within a second row of the table, the second row corresponding with the second ROI.

P. The method as recited in any one of paragraphs F-O, wherein: the first ROI and the second ROI are associated with a same object; the first row further includes at least an identifier of the machine-learned model, an identifier of a ground truth ROI associated with the same object, and the first metric data; and the second row further includes at least an identifier of the updated version of the machine-learned model, the identifier of the ground truth ROI, and the second metric data.

Q. One or more non-transitory computer-readable media storing instructions that, when executed by one or more processors, cause the one or more processors to perform operations comprising: storing, in a database, first metric data associated with a first region of interest (ROI) determined by a machine-learned model that is configured for use in a vehicle; storing, in the database, second metric data associated with a second ROI determined by an updated version of the machine-learned model; determining an association between the first ROI and the second ROI; determining a difference between the first metric data and the second metric data based at least in part on the association; and based at least in part on the difference, at least one of causing presentation of a visualization of the difference on a graphical user interface; or sending the updated version of the machine-learned model to a first vehicle.

R. The one or more non-transitory computer-readable media as recited in paragraph Q, wherein the difference is indicative of an improvement associated with the updated version of the machine-learned model and the method comprises sending the updated version of the machine-learned model to the first vehicle based at least in part on the improvement.

S. The one or more non-transitory computer-readable media as recited in any one of paragraphs Q-R, wherein: the first metric is indicative of a first difference between the first ROI and a ground truth associated with a same object; and the second metric is indicative of a second difference between the second ROI and the ground truth.

T. The one or more non-transitory computer-readable media as recited in any one of paragraphs Q-S, wherein the visualization of the difference is indicative of whether the updated version of the machine-learned model improved or retrogressed relative to the machine-learned model.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
storing, in a database, first metric data associated with a first bounding box, the first bounding box determined by a first machine-learned model based at least in part on input sensor data representing an environment in which a vehicle is operating;
storing, in the database, second metric data associated with a second bounding box, the second bounding box determined by a second machine-learned model based at least in part on the input sensor data, wherein the second machine-learned model is an updated version of the first machine-learned model;
determining that the first bounding box and the second bounding box are associated with a same object that is represented in the input sensor data;
based at least in part on the first bounding box and the second bounding box being associated with the same object, calculating multiple differences between associated metrics that are included in the first metric data and the second metric data;
causing presentation, on a graphical user interface, of a first visualization associated with a first portion of the multiple differences;
receiving a selection of one or more of the associated metrics; and
causing presentation, on the graphical user interface, of a second visualization associated with a second portion of the multiple differences, the second portion of the multiple differences corresponding with the selection.

2. The system of claim 1, the operations further comprising:
determining, based at least in part on the multiple differences, that the second machine-learned model is an improvement over the first machine-learned model; and
sending the second machine-learned model to a first vehicle of a fleet of vehicles based at least in part on the improvement.

3. The system of claim 1, wherein a first metric of the associated metrics is indicative of a first difference between the first bounding box and a ground truth bounding box associated with the same object.

4. The system of claim 2, wherein the associated metrics comprise at least one of:
yaw metrics;
point segmentation metrics;
volume metrics;
precision metrics; or
recall metrics.

5. The system of claim 1, wherein:
the database includes a bounding box metric table;
the first metric data is stored within a first row of the bounding box metric table, the first row corresponding with the first bounding box, the first row storing at least an identifier of the first machine-learned model, an identifier of a ground truth bounding box associated with the same object, and the first metric data; and
the second metric data is stored within a second row of the bounding box metric table, the second row corresponding with the second bounding box, the second row storing at least an identifier of the second machine-learned model, the identifier of the ground truth bounding box, and the second metric data.

6. A method comprising:
storing, in a database, first metric data associated with a first region of interest (ROI) determined by a machine-learned model that is configured for use in a vehicle;
storing, in the database, second metric data associated with a second ROI determined by an updated version of the machine-learned model;
determining an association between the first ROI and the second ROI;
determining a difference between the first metric data and the second metric data based at least in part on the association; and
based at least in part on the difference, at least one of:
causing presentation of a visualization of the difference on a graphical user interface; or
sending the updated version of the machine-learned model to a first vehicle.

7. The method of claim 6, wherein the difference is indicative of an improvement associated with the updated version of the machine-learned model and the method comprises sending the updated version of the machine-learned model to the first vehicle based at least in part on the improvement.

8. The method of claim 6, wherein the determining the association is further based at least in part on determining that the first ROI and the second ROI are associated with a same object.

9. The method of claim 6, wherein the first ROI is a first bounding box and the second ROI is a second bounding box, the first bounding box and the second bounding box associated with an object in an environment of the vehicle, the object comprising at least one of another vehicle, a pedestrian, a cyclist, an animal, or a distractor.

10. The method of claim 6, wherein:
the first metric is indicative of a first difference between the first ROI and a ground truth associated with a same object; and
the second metric is indicative of a second difference between the second ROI and the ground truth.

11. The method of claim 6, wherein the first metric data and the second metric data include one or more of:
a yaw metric;
a point segmentation metric;
a volume metric; or
a distance metric.

12. The method of claim 6, wherein the visualization of the difference is indicative of whether the updated version of the machine-learned model improved or retrogressed relative to the machine-learned model.

13. The method of claim 6, wherein the first ROI and the second ROI are determined by the machine-learned model and the updated version of the machine-learned model, respectively, based at least in part on input sensor data representing an environment in which the vehicle is operating, the input sensor data being part of a dataset that is associated with evaluating performance of machine-learned models.

14. The method of claim 6, wherein:
determining the difference comprises determining multiple differences between metrics of the first metric data and the second metric data, the multiple differences including at least a first difference between a first metric of the first metric data and a second metric of the second metric data; and
the visualization of the difference comprises a visualization of a portion of the multiple differences, the portion of the multiple differences including the first difference.

15. The method of claim 6, wherein:
the database includes a table;
the first metric data is stored within a first row of the table, the first row corresponding with the first ROI; and
the second metric data is stored within a second row of the table, the second row corresponding with the second ROI.

16. The method of claim 15, wherein:
the first ROI and the second ROI are associated with a same object;
the first row further includes at least an identifier of the machine-learned model, an identifier of a ground truth ROI associated with the same object, and the first metric data; and
the second row further includes at least an identifier of the updated version of the machine-learned model, the identifier of the ground truth ROI, and the second metric data.

17. One or more non-transitory computer-readable media storing instructions that, when executed by one or more processors, cause the one or more processors to perform operations comprising:

storing, in a database, first metric data associated with a first region of interest (ROI) determined by a machine-learned model that is configured for use in a vehicle;
storing, in the database, second metric data associated with a second ROI determined by an updated version of the machine-learned model;
determining an association between the first ROI and the second ROI;
determining a difference between the first metric data and the second metric data based at least in part on the association; and
based at least in part on the difference, at least one of:
causing presentation of a visualization of the difference on a graphical user interface; or
sending the updated version of the machine-learned model to a first vehicle.

18. The one or more non-transitory computer-readable media of claim 17, wherein the difference is indicative of an improvement associated with the updated version of the machine-learned model and the method comprises sending the updated version of the machine-learned model to the first vehicle based at least in part on the improvement.

19. The one or more non-transitory computer-readable media of claim 17, wherein:
the first metric is indicative of a first difference between the first ROI and a ground truth associated with a same object; and
the second metric is indicative of a second difference between the second ROI and the ground truth.

20. The one or more non-transitory computer-readable media of claim 17, wherein the visualization of the difference is indicative of whether the updated version of the machine-learned model improved or retrogressed relative to the machine-learned model.

* * * * *